(12) United States Patent
Kitano

(10) Patent No.: US 6,367,306 B1
(45) Date of Patent: Apr. 9, 2002

(54) COMPENSATING METHOD AND DEVICE FOR INSTRUMENTAL ERROR IN POSITIVE DISPLACEMENT TYPE FLOWMETER

(76) Inventor: Akitoshi Kitano, 312, 4-Chome Motoyagoto, Tenpaku-ku, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 09/399,942

(22) Filed: Sep. 20, 1999

(30) Foreign Application Priority Data

Sep. 22, 1998 (JP) ............................................. 10-268097
Sep. 7, 1999 (JP) ............................................. 11-253283

(51) Int. Cl.[7] ............................................. G01F 25/00
(52) U.S. Cl. ............................................. 73/1.27
(58) Field of Search ............................... 73/1.16, 1.19, 73/1.21–1.23, 1.27, 1.28, 861.01–861.03, 861.77, 861.78; 364/510, 571.03

(56) References Cited

U.S. PATENT DOCUMENTS 5,050,094 A * 9/1991 Kitano

* cited by examiner

Primary Examiner—Robert Raevis
(74) Attorney, Agent, or Firm—Jacobson Holman, PLLC

(57) ABSTRACT

An instrumental error compensating method has super precision measurement function, even in a condition having only micro temperature changes, by utilizing a computer which compensates for flow rate errors instantaneously and sends signals for indicating corrected values. Flowmeter (1) of the type having elliptical gears or roots type rotor has temperature sensor (5) mounted thereon and a rotation sensor (6) for indicating temperature and rotational speed of rotor. The signals from the sensors as fed to microcomputer (100). The errors can be caused by wear temperature changes, and viscosity chanter, for based on flow rate and temperature of the fluid detected by the sensors.

12 Claims, 5 Drawing Sheets

COMPENSATING METHOD AND DEVICE FOR INSTRUMENTAL ERROR IN POSITIVE DISPLACEMENT TYPE FLOWMETER

BACKGROUND OF THE INVENTION

This invention is a reform method of an industrial meter to measure fluid to flow in a pipe with high precision.

The present invention relates to a compensating method and device for instrumental error in a rotary positive displacement flowmeter. The method and device of the invention are intended for compensation of errors due to flowmeter characteristics, correlation of temperatures, subject fluid volumetric expansion, correlation of temperatures and an inner leakage correlated viscosity vs. temperature of the fluid.

Elliptical gear type and roots rotor type flowmeters are outstandingly superior in measurement functions to other conventional flowmeters, and therefore most suitable for further enhancing measurement functions of the present invention in error compensation. Moreover, reliability of flowmeters are enhanced by the present invention.

A conventional positive displacement type flowmeter with only a calculation method to revise expansion of volume accompanied with a fluid temperature inflexion, showed amount of flow. A function to revise an influence that fluid viscosity changes by a temperature missed. It is defective not to show correct amount of flow.

A revision of a capacity type flowmeter is for a temperature and a correlative relation. Change of volume versus temperature and, a revision of viscosity inflexion vs. temperature are necessary. The inventive method revises fluid volume inflexion and inside omission simultaneously.

For the inventive method to revise metering error, there is a function to revise the error of a capacity type flowmeter and it makes up for a defect of mechanical structure of the flowmeter.

Fluids generally used in plant facilities have mostly low viscosity. Fluids of low viscosity have large viscosity variations with temperature, and therefore can not be exempt from errors even with high precision instruments. Since, in low viscosity fluid viscosity, variations can result with a small temperature change, and errors in accuracy will be inevitably produced, technology is needed in temperature control when a measurement is to be conducted in such cases. Generally, it is accepted that a non-circular gear flowmeter has high reliability. The relation between the flow rate and instrumental error will be unchanged, and therefore super precision measurement can be made possible by compensation methods using microcomputers. Because of mechanical structures in rotary positive displacement flowmeters, leakage of fluids due to pressure differences can not be perfectly prevented through even small clearances between rotors or the inside wall and rotors. This leakage rate varies with viscosity changes caused by temperature changes in subject fluids and apparatus error increases or decreases throughout the flow rate range.

The action of temperature compensation mechanisms for conventional positive displacement flowmeters is to make a real time determination of the fluid expansion and shrinkage and an inner leakage from metering chamber due to temperature rise and fall during the measurement for continuous conversion to volumes at certain conditions. However, the flowmeters do not indicate real correct flows because the fluid viscosity varies with the change in the fluid temperature.

SUMMARY OF THE INVENTION

An error is not exempted, even though a viscosity exponential low case considers that a viscosity inflexion depending on a temperature used a meter of a high precision, greatly for fluid that is generally used in a conventional technology plant. Temperature though need technology of an altitude in order to manage it precisely, an even scant temperature inflexion accompanies an inflexion of viscosity, and an error of a precision depending on this occurs.

It is desirable to rotate, as a gap with both ends of a mask of a rotation body keeping an equal certain price. It scantly makes one familiarize an inflexion of a metering error performance which is important for exemption that a rotation body is kept by a central position exactly. Quantity leaking from a very small gap accompanied with an inflexion of momentum inertia depending on rotation speed of a non-round rotation body for this reason is because movement of free horizontal direction is possible for a rotation body for a conventional horizontal axis type. A clearance of both ends is not kept accompanied with a fluid stream where a metering error changes it is a defect that the exact amount of flow display is not obtained immediately. Though an electric error revision microcomputer shows a precise calculation function, if a metering error revision performance will change by abrasion of a measuring rotor element of the meter main part, such a revision becomes meaningless.

Because a minimum clearance is kept, in the intervals with a measuring chamber wall and rotor body to add an engagement mutually to form a measuring function of roots rotation body, a freedom rotation is given, and a leakage from a gap can measure it with a minimum ratio. A leakage from this clearance is prohibited. Though a metering error gets a few, the danger of stopping increases, as biting a very small solid foreign substance. Consequently, where a gap in the metering chamber is necessary, a leakage occurs necessarily, and it is impossible to do a metering error for zero.

However, for a positive displacement type flowmeter as far as there is not wear of a rotor, it is possible to minimize this by an electric revision function.

In case the temperature is high, viscosity of clear water drops, and leakage increases from a gap.

Resistance of leaking from a gap increases it, because viscosity increases on the condition that a temperature is low. An omission quantity gets a few.

The coefficient of an inflexion showed $-0.02\%/°$ C., with Oval Flowmeter of 56 type, 50 mm dia. For 0F40S Flowmeter, 40 mm dia coefficient shows $-0.03\%/°$ C. by water test.

A coefficient of Mini-oil Meter, ⅛ inch dia. (3 mm dia.) shows $-0.10\%/°$ C.

Since clearance changes relatively by a caliber of meter, a difference of this coefficient, with a small model of a caliber, a ratio of a measuring gap gets relatively large.

For an oval type flowmeter of a small size, if a clearance gets small, though a precision goes up, there is a limit, because the danger of stopping gets comparatively large.

As a positive displacement type flowmeter is a mechanical structure, with a sequence of operation time, performance falls by an abrasion of a rotation element for a measuring function. A configuration is necessary for durability to be superb.

It is important in order to keep a measuring precision to be exactly maintained a measuring function of rotator elements.

By an electric system error revision equipment for a performance of a positive displacement type flowmeter can be raised.

In the case where a metering error characteristic is certain, it is possible to obtain zero error by electronic equipment as, it is possible to revise a fluid volume expansion and meter peculiar error.

Lubrication fluid does not damage the rotation body or the inside part of the measuring chamber. Consequently, an inside clearance of a flowmeter does not change. An amount of flow is displayed as correct flow rate by a rotation of a rotor.

The inventive task is to compensate a change of liquid volume by temperature, to compensate a change of inner leakage by change of temperature and to exempt a peculiar error of flowmeter. It is the purpose to give an exact amount of flow indication.

This inventive method is a method to exclude a meter peculiar error. Leakage from meshing part of elliptic gear rotors and a clearance between an inner side of measuring chamber changes in order to differ by a temperature condition. There as meter peculiar removing is necessary.

For a cause of an inflexion depending on a temperature condition of a positive displacement type flowmeter is an inner leakage form a clearance in metering chamber and a change of fluid volume by temperature condition.

A revision calculation is possible with a single ROM having factions of volume correlate with temperature concision. It is possible to be connected to a CPU by a wire from a temperature sensor.

A revision function of leakage works based on the fluid volume change and viscosity inflexion.

A ratio of inner leakage is large on an elliptic gear type flowmeter of a small-sized model.

A problem that a metering error shows a high ration can be settled by an electronic revision function system.

A revision to make the quantity of inner leakage less and a microcomputer to equip a functional ROM to add a calculation of total amount of flow, may completely decrease the metering error.

The condition of fluid state of a stream is a correlative relation of a process of a plant. It is difficult directly to measure these change factors.

It is possible to get this inflexion at real time and to convert amount of flow. Since it is possible momentarily precisely to measure a temperature change, it can measure with high revision function by a precise measurement of a temperature.

Since a high electronic system revision equipment gives a precise revision, it can measure an error by the flowmeter main part that a measuring function is stable and an electronic revision system.

FIG. 1 shows the performance of a positive displacement type flowmeter.

A line (A) shows a line of no error flow.

FIG. 2 shows Q-E curve of the case where temperature differs.

Curve (C) shows the case where temperature is low and curve (C) shows the case that a temperature is high.

This phenomenon is that fluid viscosity changes by temperature.

A theoretical line (A) and a line of metering error vs. rotor speed curve (B), shows a certain relation as shown in FIG. 1. By this relation, a peculiar error of a flowmeter can be excluded.

By this relation, a peculiar error of a flowmeter is excluded. This function to exclude a peculiar error is put in a microcomputer.

In case temperature inflexion is few, a specific gravity and viscosity of fluid change, is needed. Also, a revision must be included in an amount of flow calculated by a rotation speed of a rotation body.

Line (A) of FIG. 2 shows the relationship of metering error vs. flow. Curve (C) and curve (D) show metering errors. Where flow curve shows an actual measurement flow and the curve of (D) shows a more high-temperature case in comparison with a curve of (C).

With an experimental result, change of peaks of X1 and X2 varied by temperature and change on low speed of Y1 and Y2 and Z1 and Z2 on high speed are not in proportion. They show specific inflections respectively.

By measurement of fluid liquid, metering error vs. amount of flow curve is shown for a specific shape, and the error increases with low viscosity fluid.

In the case of measurement standard temperatures for 15° C., a metering error vs. flow curve (B) at a temperature 15° C. is gain if revising a curve (C) or a curve (D) with a condition revision.

With revision methods of temperature vs. volume inflexion, temperature vs. inner leakage inflexion and rotor speed vs. peculiar error exclusion, become a straight line (A), as displayed.

Against a metering error vs. amount of flow curve to be considered ideal, there are errors between coefficients of rotor speed vs. metering error and temperature inflexion vs. metering error respectively.

It displays a more exact flow for including a revision with a specific ratio.

An extremely a high precision is shown which is less than ±0.05% or ±0.02% for a positive displacement type flowmeter by using an electrolyzed revision function like this.

FIG. 4 shows a metering error characteristic curve where a gap of a rotation body mutual interval and a rotation body and measuring chamber is small.

A clearance is of very small size has the danger to bite a foreign substance and becoming stopped.

Because a gap is set up, a rotation body rotates free, however a metering error curve is an inferior straight line.

It is possible to raise a measuring precision by adding a measure to revise this inner leakage.

FIG. 1 Q-E curve (B) shows a performance of an actual flow of a flowmeter, and the curve revised an inner leakage and a volume expansion by temperature.

A metering error (E) shows a large value in the case where rotor speed is slow or high. A line (A) shows the Q-E line excludes a metering error. This line shows exact amount of flow.

FIG. 1 shows that a metering error vs. rotor speed curve (B) against a theoretical Q-E curve (A) creates a certain relationship.

A metering error (E) that increase at a low rotation speed and high speed rotation range is decreased by a method to add revision value to the flow converted.

As revising a metering error depending on a peculiar error of a meter, corrected amount of flow is shown with a line (A) added by a function of a calculation equipment.

Fluid specific gravity and viscosity of fluid change with a temperature inflexion of a few degrees in case of the same specification.

An amount of flow to have had calculated and display by a rotation speed of rotors must be included in a revision value.

A line (A) of FIG. 2 shows a relationship of a metering error vs. flow, and a curve (C) and a curve (D) are metering error vs. flow curve showing an actual measurement flow.

Curve (D) shows a more high-temperature case in comparison with a curve (C).

With an experimental result, difference of an inflexion peak X1 and X2 against temperature inflections of a curve (C) and a curve (D) and difference of an inflexion peak Z1 and Z2 on high-speed range is not in proportion.

It shows a specific inflexion respectively.

A metering error vs. flow curve shows a specific shape by a fluid liquid and as a low viscosity fluid case, it is increased.

In the case where the set up standard temperatures are 15° C., metering error vs. flow curve (B) at a temperature of 15° C. is a gain, if revise a curve (C) or a curve (D) with a revision method excludes an influence of viscosity.

This curve changes to the straight line (A) by a method of a peculiar error revision, which is a method to compensate volume change of fluid. Then, the exact amount of flow that an error excludes displays it.

A metering error characteristic curve, that is decided by a design specification of the flowmeter main part, is a correction made by an electronic calculation method.

The correct amount of flow is then displayed.

A metering error vs. flow curve and a temperature change vs. metering error are related to each other.

This is shown as an error. It is displayed as a more exact flow revised with a specific ratio.

It is available as its super-precise measurement of amount of flow, process management business at a chemical industry especially. Extremely high precision shows it as less than ±0.05% accuracy for a positive displacement type flowmeter by including an electric revision function like this. Most errors are excluded with a revision function and become a theoretical curve (A) as shown in FIG. 1. A metering error that is decided by a specification of the meter main part is excluded. A metering error corresponded to rotor speed is excluded. By this revision, correct amount of flow is shown.

FIG. 3 shows Q-E curve in the case of low viscosity fluid and large clearance in the metering chamber the quantity of leakage is high.

It is available as its super-precise measurement of amount of flow, process management business at a field of a precise chemical industry especially.

Extremely high precision is obtained, less than ±0.1% for a positive displacement type flowmeter, by including an electrolyzed revision microcomputer.

For an inventive measure to obtain a revision value for a fluid volume change and viscosity inflection, error revision value of a peculiar characteristic inflexion error of positive displacement flowmeter in real time.

A temperature sensor of highly accurate measurement function shows a revision value for a viscosity measurement. A more correct revision is obtained by this measure.

It is converted into a standardized flow condition.

Factors of a viscosity vs. temperature, specific gravity vs. temperature and a peculiar error of meter body vs. rotor speed are input in the ROM of the microcomputer.

By equipping this electric revision equipment, measuring the function of a super-high precision of flowmeter is obtained on a correlative relation with a meter peculiar error and a rotation speed at real time calculation.

The inventive purpose is to wholly revise a difference between an indicated flow and actual amount of flow.

The microcomputer calculates the fluid volume to revise, and the inner leakage that it changes by a viscosity inflexion by temperature and a meter peculiar error is revised by a function of a pulse of magnet sensor vs. peculiar error.

For this invention, all errors of a positive display type flowmeter are revised and show the exact amount of flow.

Flowmeter error revision method of a positive displacement type flowmeter, put on, and or, display integrating total flow and or momentary amount of flow by a measurement function of a non-circular rotation body to measure a fluid stream.

The invention is a method to display the amount of flow at real time by an electronized type, to revise it, except a flowmeter peculiar error, and carry out an operation of amount of flow at an environment functional method. Consequently, by a meter peculiar design, as differing every flowmeter by fluid even though a different element necessarily differs.

For ROM to input a revision factor that is for a metering error revision, by this meter peculiar element and a fluid temperature inflection, a revision value is different inevitably. It is installed with a data and input for a microcomputer for ROM. It is equipped with a data input for a microcomputer for ROM.

By an inflection of a temperature condition, fluid viscosity changes. A fluid stream to flow for measuring then changes to be scant.

This and a temperature inflexion are possible, though they grasp it by an electric machine signal of a minute quantity inflexion. Then, it precisely measures a fluid stream. Before, it is explained an error of small amount of flow function that to be excluded separately respectively for a calculation of total momentary amount of flow. This purpose is to carry out an operation at real time and display exact amount of flow.

The function is to calculate these plural calculation functions simultaneously.

A function of an electronic calculation equipment for plural signals by functions to be inputted simultaneously, calculates it with the same microcomputer. For instance, a pulse dispatches from a temperature sensor for a microcomputer. It is carried out by an operation of total amount of flow or momentary amount of flow then, and it revises a measuring chamber inside an omission inflection for this by a viscosity inflection to be based on a correlative relation of temperature vs. viscosity. Put on for ROM to input the coefficient of a measurement fluid temperature vs. viscosity inflexion, temperature vs. volume expansion inflexion, a total based on, or ROM to input momentary amount of flow. This method is a vessel difference revision method. To consider it, as a strong point, use a ROM to input the coefficient of a fluid measuring indoor omission and temperaturing change.

For the present invention the flowmeter is equipped with a ROM to input data for a function to revise a measuring chamber inside inflexion of an omission.

The flowmeter dispatches a pulse from a magnet sensor accompanied with a rotation of a non-circular rotation body to form a measuring function.

This invention has a ROM having a function to exclude a metering error, another ROM to input a functional data to calculate momentary amount of flow function, to revise an inflexion of fluid temperature volume for a pulse and to dispatch from a temperature sensor. The flowmeter is to equip ROM to input data to revise a measuring chamber inside inflexion of an omission. The flowmeter main part depends on a temperature condition, and fluid resistance is to be based on fluid disposition. The method to be suspended on the electron style machine difference revision and equips the ROM to input the characteristic to sum up a factor of a volume inflexion.

It is a size of the flowmeter main part, depending on a temperature condition, with the fluid resistance to be based on a fluid disposition. The method to be suspended on the electron style machine difference revision is to equip ROM to input the characteristic to sum up a primary factor of a volume inflexion.

The flowmeter in the present invention dispatches a pulse from a magnet sensor accompanied with a rotation of a non-round rotation body to form a measuring function. For a microcomputer that is attached to this, the function and total sink to exclude a vessel difference curved peculiar error. The ROM inputs a functional data to calculate momentary amount of flow function to revise an inflexion of fluid temperature volume for a pulse that dispatch from a temperature sensor. It is the flowmeter to equip ROM to input data to have for a function to revise a measuring chamber inside inflexion of an omission. It is a size of the flowmeter main part depending on a temperature condition, fluid resistance to be based on a fluid disposition, method to be suspended on the electron style machine difference revision to equip ROM to input the characteristic to sum up a primary factor of a volume inflexion.

BRIEF DESCRIPTION OF THE DRAWINGS

The invention will now be described in detail with reference to the accompanying drawings wherein.

DETAILED DESCRIPTION OF THE PREFERRED EMBODIMENT

In this embodiment, a flow rate calculator means calculates an instantaneous flow rate based on the frequency of the output signal of the flowmeter, and generates an output signal indicative of the instantaneous flow-rate.

Flow-rate compensation section identifier means identifies, in response to the output signal of the flow-rate calculator means specific one of predetermined flow-rate compensation sections to which the calculated instantaneous flow-rate belongs, and generates a signal indicative of the identified section. Compensation constant selector means stores in advance a plurality of compensation constants necessary for calculating an instrumental error of the flowmeter, selects a specific compensation constant in response to the output signal of the identifier means, and generates a signal indicative of the compensation constant.

Furthermore, the compensation constant selector means is connected to an input-output unit comprising a ROM for storing series of volume coefficient for the liquid based on different temperatures and viscosity of the liquid.

A rotation detector sensor for input of pulse signals to indicate a measurement per revolution of the rotor of the flowmeter and a temperature sensor to detect the fluid temperature and a microcomputer are provided. A pickup coil or the like, senses rotations of a rotor which is rotated by a fluid flowing through the flowmeter, the rotations being converted into electrical pulses.

The period of the flow-rate pulse signal is measured, a flow rate per one rotation pulse is read out from data of the period previously storing ROM (read only memory) and compensated flow-rate, and real-time temperature compensation coefficient are read out from the specific gravity for each temperature stored in ROM and temperature compensation data indicated, and this mentioned low rate for each of the above mentioned pulses is modified.

This modified flow rate is further compensated by the following method; a modification value is determined by the compensation coefficient obtained by the viscosity instrumental error correction to temperatures from the compensation coefficient data stored in ROM for indicating viscosity previously for each temperature, and the above mentioned modified flow rate is added with said modification value or real time modification.

When a flow-rate Q is calculated, the flow rate Q is identified. Therefore, based on data which were computed in advance using instrumental errors of flow rates Q, a compensation coefficient is determined.

The calculated coefficient is used for compensating an error. The data are obtained from actually measured instrumental errors by a method of tolerance.

Figure 1:
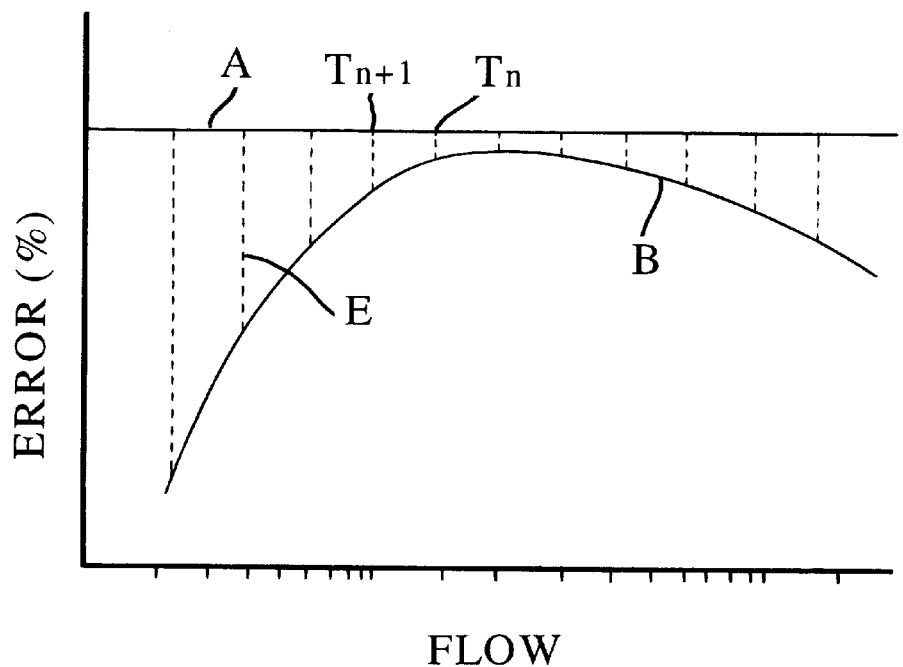
FIG. 1 shows a curve QE (flow vs. metering error) for illustrating the correlation between instrumental errors and rotor rotational speed.
Figure 2:
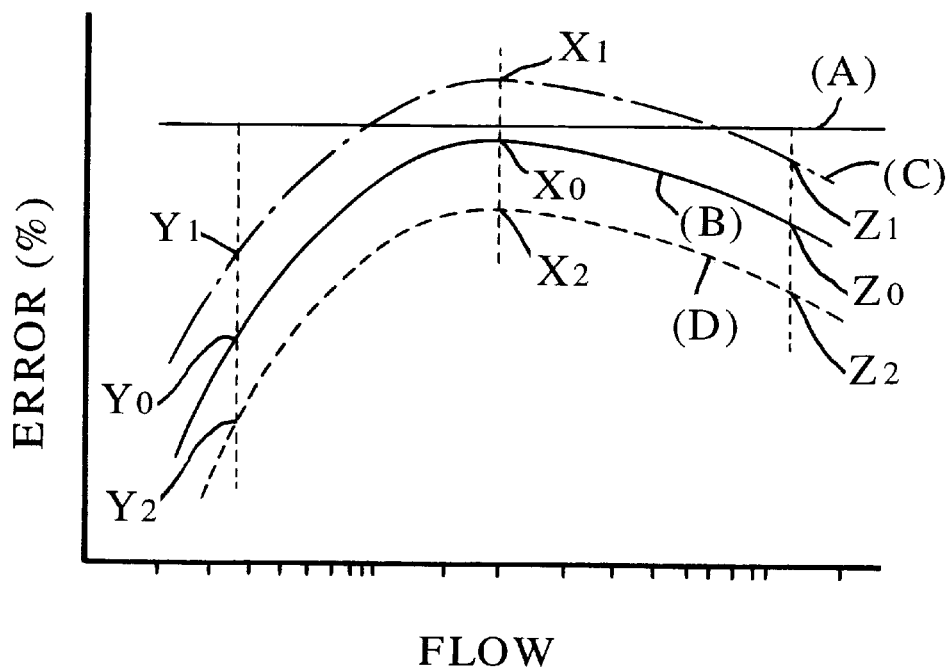
FIG. 2 shows a QE curve of a subject fluid compensated for viscosity index and volumetric expansion coefficient at a high temperature for comparison to the curve at a reference temperature.
Figure 3:
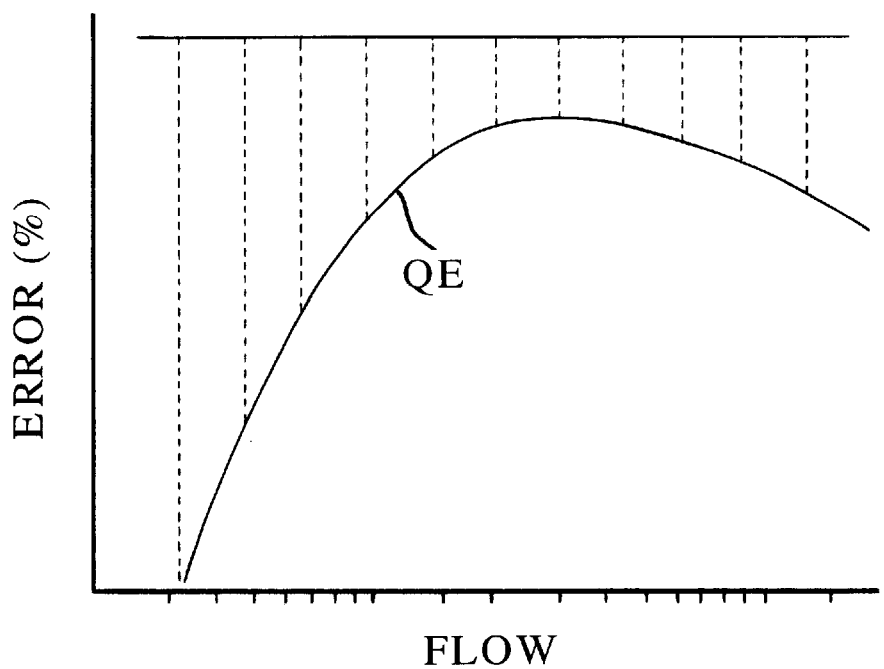
FIG. 3 shows a QE curve for an instrument with large clearances.
Figure 4:
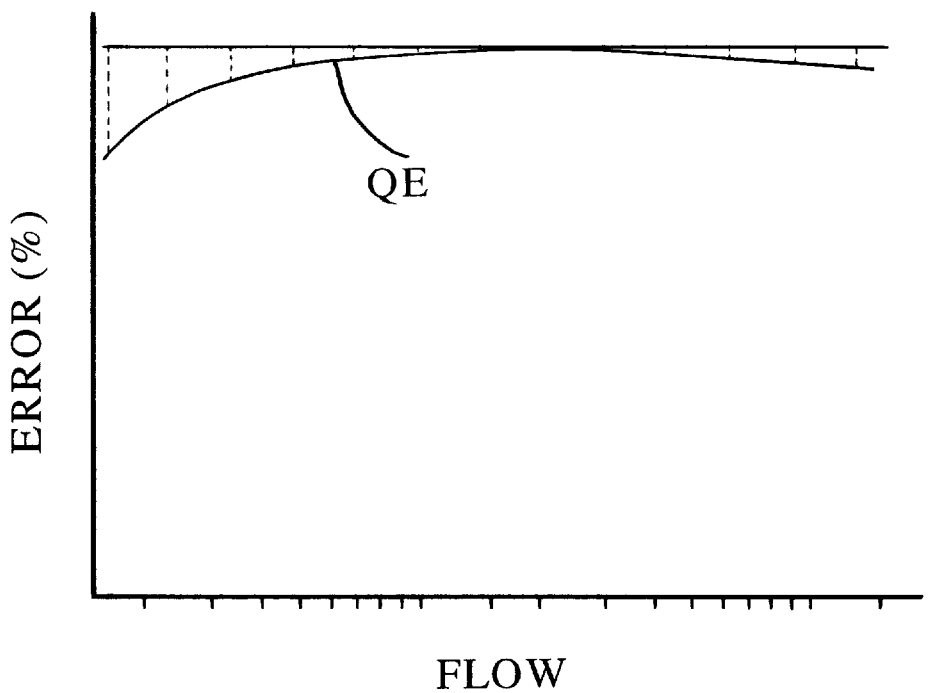
FIG. 4 shows a QE curve for an instrument with smaller clearances.
Figure 5:
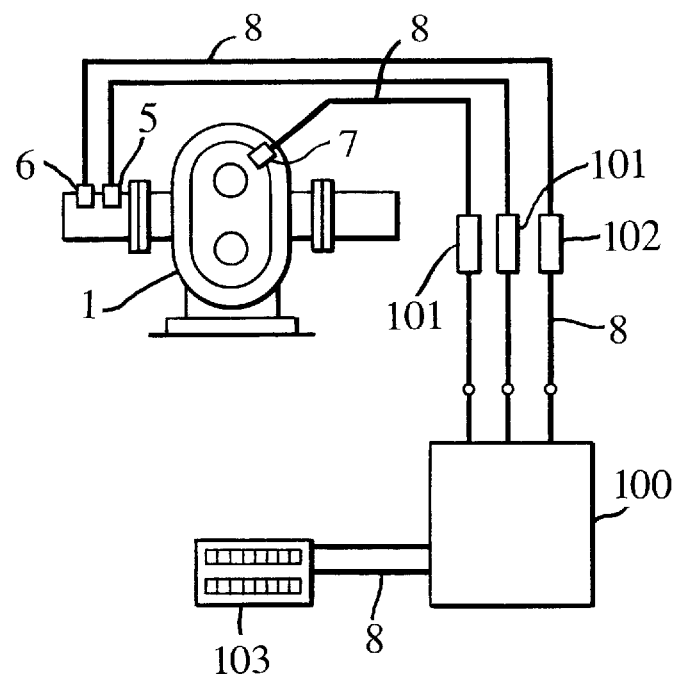
FIG. 5 is a diagrammatic illustration of an instrument having a built-in temperature sensor, and a computer equipped with ROM for instrumental error compensation.
Figure 6:
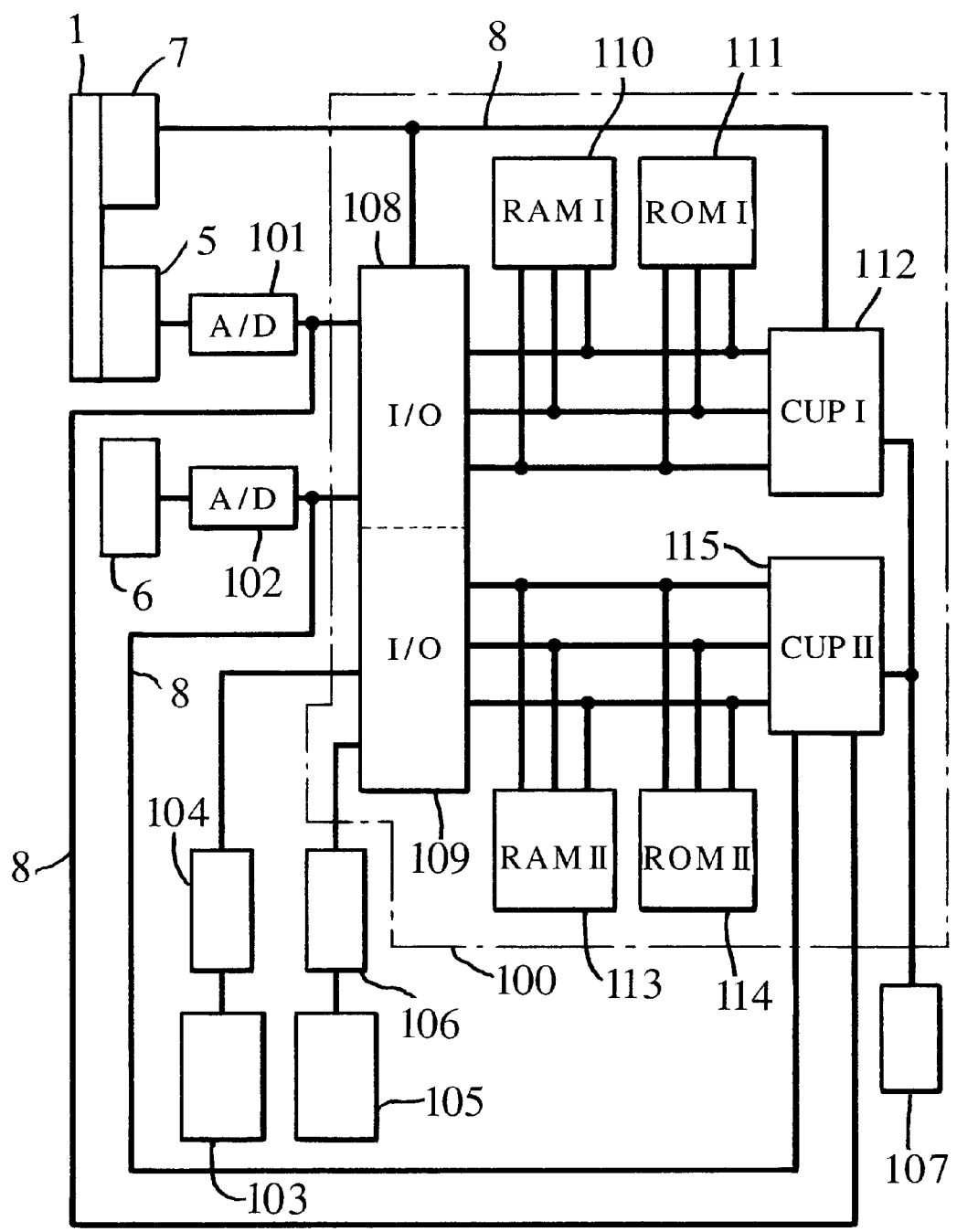
FIG. 6 is a schematic circuit diagram showing an instrumental error compensation system comprising CPU, I/O converter, ROM, RAM and other elements.

With reference to the embodiment shown in FIG. 5 and FIG. 6, the numeral 1 denotes a positive displacement type flowmeter 1 and numeral 5 denotes a temperature sensor installed in the metering chamber or in the piping directly connected thereto. Signals of temperature sensor 5 are transferred to the control unit 100 with a wire cable 8, via A/D converter 101.

The numerical 7 denotes a rotation detector sensor mounted on flowmeter 1 for detecting the rotation of the rotor. Signals transmitted from an arithmetic unit in the control unit 100 received by wire cable, or optical fiber cable 8' via A/D converter 102, actuate indicator 103 via line 8.

FIG. 6 is an illustration of the internal circuitry of the control unit 100, and equipment connected thereto. The pulse signals from the temperature sensor 5 and rotation detector sensor 7 transmitting the rotation speed of the non-circular gear rotors in the metering chamber are input to the interface 108. Sensor 7 is inputted to the interruption terminal of the central control unit CPU (I) 112 and sensor 5 is inputted to the interruption terminal of control unit CPU (II) 115.

By this interruption, CPU (I) 112 confirms for calculation, by checking the input of input-output interface 108, 109 and the proceeds to calculation that the pulse input has been made. During the time between this pulse input and its preceding pulse input, or the pulse interval, the flow-rate per pulse is read from the compensation data corresponding volume coefficient of the liquids of the instrumental error previously stored in ROM (I) 111 and the temperature read out that is obtained by converting the specific resistance of the temperature sensor 5 into a digital value by analog-digital converter 101. The random access memory RAM (I) 110 is used for the temporary storage of variables and calculations. The base flow rate may be calculated similar with respect to an indication of time as provided by clock 107 with provides a highly accurate time base reference for the microprocessor system.

By the temperature vs. specific gravity data previously stored in ROM (I) 111, the flow rate per pulse is converted into the flow rate at a reference temperature, for example, 20° C. The numeral 113 denotes a random access memory RAM (II).

RAM (II) is used for the temporary storage of variables and calculations and ROM (II) stores temperature vs. viscosity data. This converted flow rate is further fed-back to the input-output interface 108, 109 and delivers a signal to the interruption terminal processing unit CPU (II) 115. Next, the flow rate per pulse of the pulses from the rotation detector sensor 7 is read out, which is obtained by converting the specific resistance of the temperature sensor 5 from the instrumental error compensation data of which reference to the temperature vs. viscosity coefficients stored in ROM (II) given by converting the signal of the temperature sensor 5 installed in the flowmeter 1 with the A/D converter 101, and the above mentioned flow rate is converted into the flow rate at the reference temperature.

Then, an accumulated flow or instantaneous flow rate is indicated on the indicator 103 via the driver 104. Alternatively, the counter 105 is brought into action via driver 106. A circuit for compensating for an instrumental error of a flowmeter which generates a pulse signal having a frequency proportional to a flow rate comprises; use distributor means for generating two different pulse signal in response to the pulse signal output from the flowmeter, the two pulse signals having a predetermined frequency ratio to each other; flow rate calculator means for calculating an instantaneous flow rate based on the frequency of the output signal of the flowmeter and generating an output signal indicative of the instantaneous flow rate.

Flow rate compensation section identifies means for identifying, in response to the output signal of the flow rate calculator means, specific ones of predetermined flow rate compensation sections to which the calculated instantaneous flow rate belongs, and generating a signal indicative of the identified section; compensation constant selector means for storing in advance compensation constants for calculating an instrumental error of the flowmeter, selecting specific ones of the compensation constants in response to the output signal of the identifier means, and generating a signal indicative of the compensation constant.

The conversion into a correct flow rate is made by using the above mentioned electronic compensation mechanisms and the instrumental errors are compensated for indication.

Figure 7:
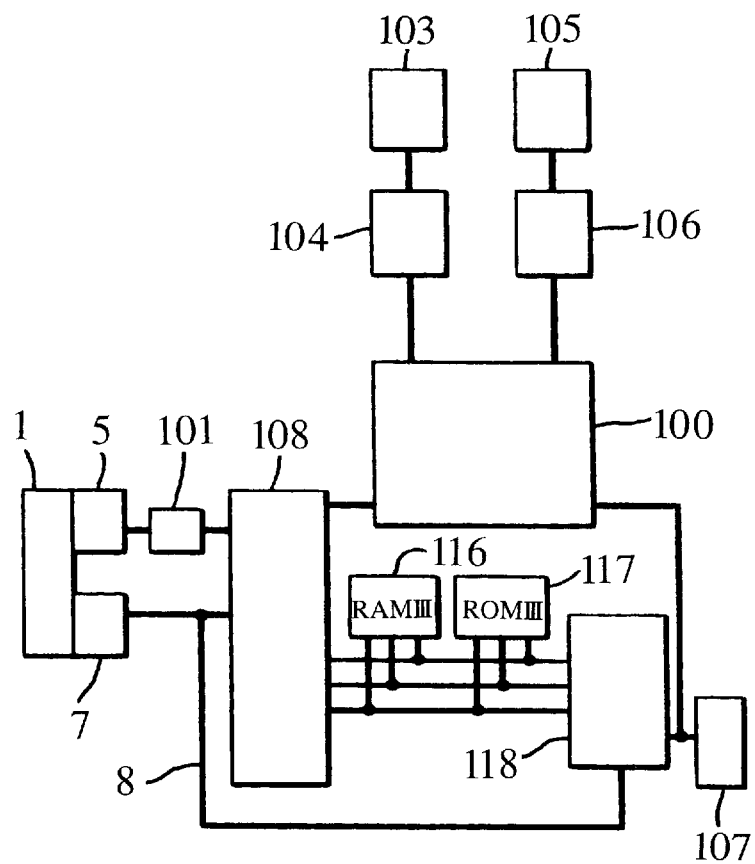
FIG. 7 is schematic circuit diagram incorporating a control unit for input of magnetic sensor interruption and clock signal interruption for compensating characteristic curve errors to the ideal QE curve between a flowmeter with a built-in rotation magnetic sensors, and control unit.

FIG. 7 shows a circuit diagram of another embodiment incorporated between a control unit and flowmeter with another control unit for input of interruption of a magnetic sensor to compensate for errors of characteristic curve to ideal Q-E curve and for interruption of clock signals. This is an electrical circuit diagram read out for compensation of the data to compensate characteristic errors of flowmeters to the ideal QE curve stored in ROM (III) 117 as well as to make instrumental error compensations based on the fluid volumetric changes and correlations of temperature vs. viscosity with the control unit illustrated in FIG. 5. RAM (III) 116 is provided in the circuit in the same position and for carrying out the function similar to RAM (II) 113 in the FIG. 6 embodiment. The pulse signals from the rotation detector sensor 7 for indicating the rotation of rotors in the flowmeter and from temperature sensor 5 are input to the input interface 118.

Rotation detector sensor 7 is also connected to the interruption terminal of central unit CPU (III) 118. It confirms by checking the input of the input output interface 108; read out the flow per one pulse using the time between this pulse and the preceding pulse from the compensation data on instrumental errors stored in ROM (III) 117 to make compensations for instrument-specific errors in each of the flow ranges; and calculates compensation values of instrumental errors due to volume, specific gravity and viscosity changes arising from the fluid temperature changes by using the control unit 100 illustrated in FIG. 6.

Figure 8:
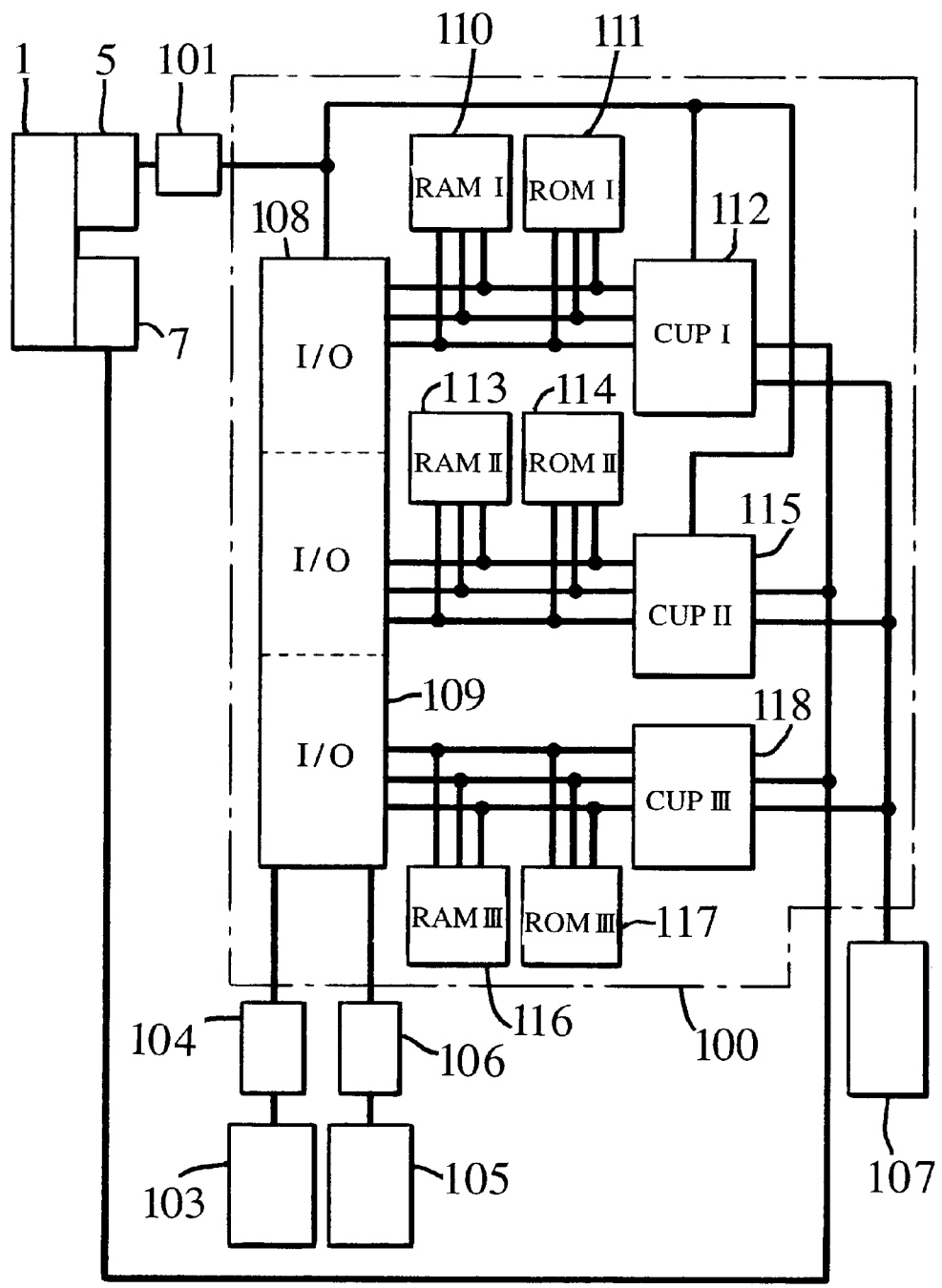
FIG. 8 is a schematic circuit diagram illustrating a compensation unit incorporated with circuits to compensate instrumental errors due to viscosity and specific gravity changes due to temperature changes of an instrument with built-in rotation magnetic sensors and temperature sensors.

FIG. 8 shows a circuit diagram of a control unit combining an electrical circuit incorporating instrumental error values due to volumetric changes and viscosity change arising from the above mentioned temperature changes and an electrical circuit including ROM 117 to compensate characteristic errors specific to the flowmeter; the unit has indication and transmission functions for compensation values of instantaneous instrumental errors.

The instrumental error compensation apparatus is a microprocessor control unit and further comprises ROM for storing the instrumental error compensation data which compensates for instrumental error values including functions of adding up both of error values due to volumetric and viscosity changes corresponding to temperature changes.

The flowmeter 1 is connected with the control unit 100 having microcomputers through the viscosity sensor 6 and encoder 102 so that the measured volumetric value is fed to the computer after conversion to a pulse signal.

The pulse signal generator or encoder 102 is connected with a rotor of the flowmeter 1 so that a magnet inserted on the side of the rotor is rotated in conjunction with the revolution of the rotor. The encoder 102 also has an elector magnet detector cell so that a pulse signal is generated each time the pulse is generated. The computer unit 100 is also supplied with a signal from the temperature sensor 5 in connection with the temperature for the liquid flowing through a conduit after conversion into a digital signal. In the control unit 100, the volume coefficients for liquids each having a different specific gravity, are memorized for the predetermined range of temperatures.

Upon receiving the signal of the temperature of the fluid flowing through the conduit, the control unit 100 picks up a corresponding volume coefficient and prepares to count a calculation at every arrival of a signal from the pulse signal generator 7. Each time the control unit 100 makes a calculation to provide a corrected volume which is transmitted to the integrating indicator 103.

The clock 107 serves to give the necessary instructive pulse to the computer so that the central processing unit (CPU) measures an occasional temperature of the fluid and provides a corresponding volume coefficient.

The generation of subsequent instructive pulses every few seconds is sufficient in view of the time constant of the temperature sensor 5 and also because the temperature change of the fluid generally occurs gently.

The control unit 100 has an amplifier and an analog-digital (A-D) converter 102 so that the signal from the viscosity sensor 6 is fed to the computer through both elements.

The microprocessor control unit further comprises ROM VI for storing the revision factor combined the temperature vs. volume change of liquid data and or the revision factor of temperature vs. inner leakage in the metering chamber data.

The microprocessor control unit further comprises ROM VII for storing the revision factor combined the pulse of a magnet sensor vs. the peculiar-error of flowmeter data and or revision factor of a magnet sensor vs. flow rate of a flowmeter.

A ROM, to add plural revision functions, makes an organization simplified and effective.

THE NUMERAL DENOTES:

1: flowmeter 5: temperature sensor 6: viscosity sensor 7: rotation detector sensor 8, 8': cable 100: control unit 101, 102: analog-digital converter 103: indicator 104, 106: driver 105: counter 107: clock 108, 109: input/output interface 110, 113, 116: RAM 111, 114, 117: ROM 112, 115, 118: CPU

What is claimed is:

1. An instrumental error compensation apparatus for a fluid flow measuring instrument comprising:

a positive displacement flowmeter having a rotor and inlet and outlet means for measuring the flow rate of fluid flowing therethrough;

temperature sensor means mounted on said flowmeter for measuring the temperature of the fluid flowing through the flowmeter and for producing an electrical signal representing the measured temperature;

rotation sensor means mounted on said flowmeter for measuring the rotation speed of said rotor and for producing an electrical pulse signal representing the measured rotation speed;

microprocessor control unit means for receiving said electrical pulse signals from said temperature and rotation sensor means;

electric pulse signal conducting means for operatively connecting said temperature and rotation sensor means to said control unit means for conducting said signals from said temperature and rotation sensor means to said microprocessor control unit means;

said microprocessor control unit means including means for correlating the viscosity of the fluid as a function of the measured temperature with instrumental error and storing correlated temperature-viscosity data;

means for determining the period of pulse signals transmitted for each rotation of said rotor, and means for calculating a compensation value from the instrumental error compensation data based on the correlated temperature-viscosity data stored in said microprocessor control unit means;

means for calculating a first flow rate from said electrical pulse signal representing measured rotation speed and modifying said first flow rate by said compensation value to procure a second flow rate;

means for outputting and indicating said second flow rate in real time;

a compensating characteristic errors ROM for storing compensating characteristic errors specific to the flowmeter;

means for making instrumental error compensations based on fluid volumetric changes and correlation of temperature viscosity;

means for feeding said instrumental errors to said microprocessor control unit; and a magnet sensor and temperature sensor connected to an input/output interface for calculating a flow rate.

2. The instrumental error compensation apparatus as claimed in claim 1, wherein said microprocessor control unit means comprises:

a temperature-viscosity ROM for storing temperature-viscosity data.

3. The instrumental error compensation apparatus as claimed in claim 1, wherein said microprocessor control unit means comprises:

an instrumental error compensation ROM for storing said instrumental error compensation data; and means for compensating instrumental error values due to volumetric and viscosity changes corresponding to temperature changes.

4. The instrumental error compensation apparatus as claimed in claim 1, wherein said microprocessor control unit means further comprises:

an instrumental error value ROM for storing instrumental error values which include functions of adding both the error values due to volumetric and viscosity changes corresponding to temperature changes.

5. The instrumental error compensation apparatus as claimed in claim 1, wherein said microprocessor control unit means further comprises:

a rotor speed-peculiar ROM for storing a rotor speed-peculiar error of flowmeter data.

6. The instrumental error compensation apparatus as recited in claim 1, wherein said microprocessor control unit means further comprises:

a revision factor combining the temperature ROM for storing a revision factor combining the temperature vs. volume change of liquid data.

7. The instrumental error compensation apparatus as claimed in claim 1, wherein said microprocessor control unit further comprises:

a revision factor combining the pulse of a magnet sensor ROM for storing a revision factor combining the pulse of a magnet sensor vs. the peculiar error of flowmeter data.

8. The instrumental error compensation apparatus as recited in claim 1, wherein said positive displacement flowmeter for excluding a peculiar error of said flowmeter by compensation functions using:

the interrelation of said rotation speed of rotation body and the peculiar error of flowmeter;

a compensation function using the interrelation of temperature vs. volume change of fluid flow; and a compensation function using the interrelation of temperature vs. inner leakage change of fluid flow in a meter chamber.

9. The instrumental error compensation apparatus as recited in claim 1, wherein said microprocessor control unit means further comprises:

a revision factor combining the temperature ROM for storing a revision factor combining the temperature vs. volume change of liquid data and the revision factor of temperature vs. inner leakage in the metering chamber data.

10. The instrumental error compensation apparatus as claimed in claim 1, wherein said microprocessor control unit further comprises:

a revision factor combining the pulse of a magnet sensor ROM for storing a revision factor combining the pulse of a magnet sensor vs. the peculiar error of flowmeter data and revision factor of a magnet sensor vs. flowrate of a flowmeter.

11. The instrumental error compensation apparatus as recited in claim 1, wherein said microprocessor control unit means further comprises:

a revision factor combining the temperature ROM for storing a revision factor combining the revision factor of temperature vs. inner leakage in the metering chamber data.

12. The instrumental error compensation apparatus as claimed in claim 1, wherein said microprocessor control unit further comprises:

a revision factor combining the pulse of a magnet sensor ROM for storing a revision factor of a magnet sensor vs. flowrate of a flowmeter.

* * * * *